United States Patent Office 3,745,140
Patented July 10, 1973

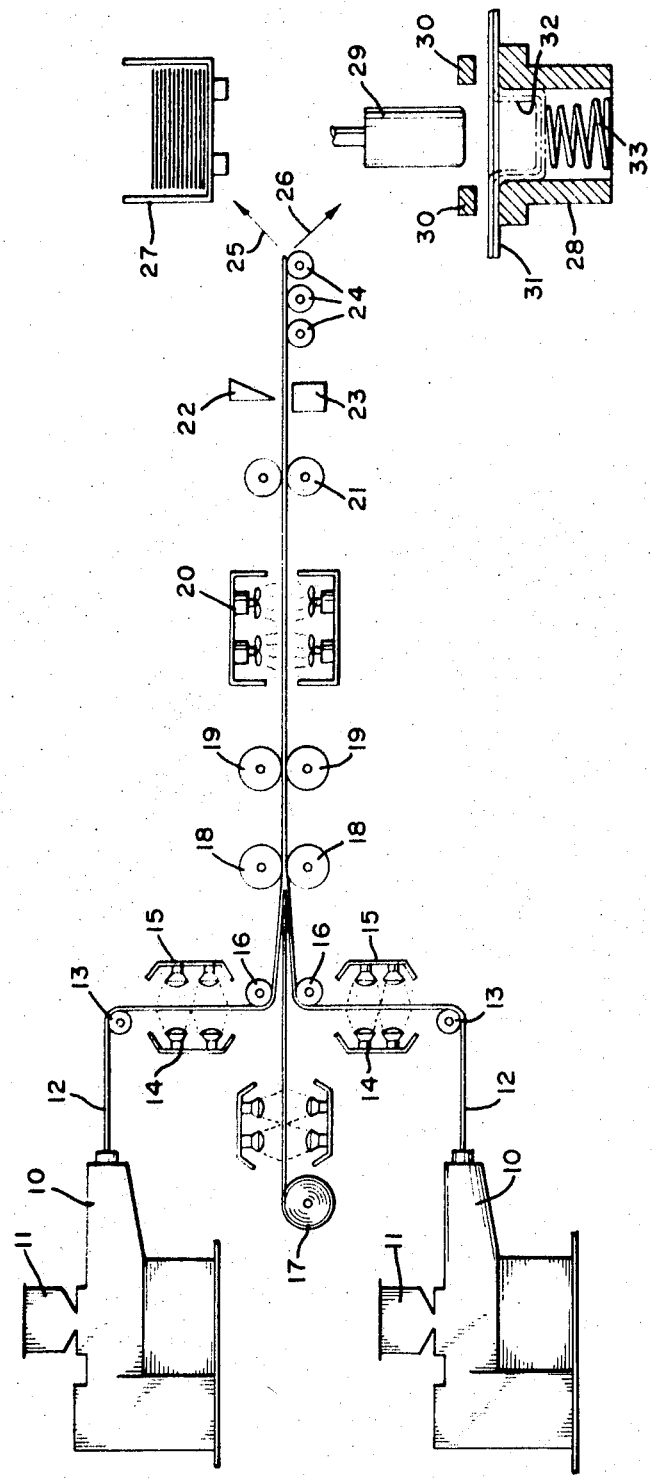

3,745,140
SHAPABLE FIBER-REINFORCED NOVACULITE-FILLED LOW MOLECULAR WEIGHT POLYETHYLENE TEREPHTHALATE
Leon Segal, Morristown, N.J., assignor to Allied Chemical Corporation, New York, N.Y.
Filed Sept. 22, 1971, Ser. No. 182,600
Int. Cl. C08g 51/04
U.S. Cl. 260—40 R                    8 Claims

ABSTRACT OF THE DISCLOSURE

Glass fiber-reinforced, novaculite-filled PET composite sheets are formed using semi-crystalline PET having its glass transition temperature above room temperature. These composite sheets can be cold formed, i.e. shaped in a cold mold when preheated outside the mold, and possess physical properties superior to sheets prepared using unfilled PET or PET containing fillers other than novaculite.

BACKGROUND OF THE INVENTION

This invention relates to shaped thermoplastic articles. More particularly, this invention relates to a composite sheet consisting of thermoplastic low molecular weight polymers of polyethylene terephthalate, hereinafter PET, reinforced with glass fibers and containing novaculite, wherein the said sheet can be shaped into items of desired geometry in a shaping apparatus operating at essentially ambient temperature when said sheet is preheated to a temperature above the softening point of the polymer.

It is known that many thermoplastic polymers can be formed at ambient temperature by means of various cold sheet metal-forming techniques such as deep drawing, stretch forming, stamping, etc. These cold sheet metal-forming processes are economically very attractive because it is possible to achieve rapid production rates, e.g. rates that exceed one item per second or even faster. Unfortunately, the products prepared by the prior art, due to the limitations imposed by the starting materials which can be shaped by such rapid forming means, exhibit deficiencies in their properties namely, poor dimensional stability under load, a tendency towards stress cracking, low heat distortion temperature, modulus of elasticity, and strength, etc. Consequently, the potential for a broad range of end-use applications has heretofore been severely limited.

Many attempts have been made to overcome these problems by altering either the forming process or the construction of the sheets without adversely affecting the rate of production (generally the residence time in the mold). For example, it is known that one can improve the heat distortion temperature, impact resistance, and over-all performance of the shaped item in a process where preheated thermoplastic sheets are shaped in a cold mold by the use of glass-reinforcement for said sheets. This technique has not heretofore been considered applicable except to amorphous polymers such as polyvinyl chloride and styrene-acrylonitrile copolymer or to crystalline polymers having a very high molecular weight, such as polypropylene.

All these polymers, which have hitherto been employed in rapid forming operations, exhibit a very high melt viscosity at their softening point and will therefore not flow under their own weight. For example, the specific values of the melt viscosity at the softening points of several commercial-grade polymers are as follows:

Polyvinyl chloride $10^{13}$ poise at 87° C. and $3 \times 10^5$ poise at 150° C.

Styrene acrylonitrile copolymer $10^{13}$ poise at 100° C. and $2 \times 10^5$ poise at 200° C.;

Polypropylene $2 \times 10^6$ poise at 175° C. and $7 \times 10^5$ poise at 200° C.

It is this high melt viscosity of the polymers hitherto employed in cold mold forming which allows one to preheat the reinforced polymer sheets without losing sheet coherency before placing the sheets in the forming press where they are shaped in a cold mold.

SUMMARY OF THE INVENTION

I have now discovered a method and formulation which allows the use in conjunction with fiber reinforcement of high melting, low molecular weight, low melt viscosity semi-crystalline polymers of the linear polyester type, which have a glass transition temperature above 25° C., and excellent high temperature properties in cold mold stamping operations.

Although the subsequent discussion will be directed primarily to PET, it should be noted that the instant invention is also applicable to other linear low molecular weight polyesters, as will be more particularly described hereinafter.

It has been common in the prior art to incorporate particulate filler materials, i.e. non-fibrous fillers, into many polymeric compositions in order to increase stiffness, improve electrical properties, reduce crystallization tendencies and reduce cost. However, such particulate fillers have generally been regarded as non-reinforcing in thermoplastics, as opposed to fibrous fillers which are usually regarded as true reinforcing agents. This invention also relates to the incorporation of a reinforcing particulate filler into the polymeric PET phase, yielding improved formable compositions. The high level of particulate fillers utilized in the practice of my invention has heretofore not been utilized because of the adverse effect thereof on impact strength.

Standard commercial plastic or fiber-grade polyester polymers have a rather low molecular weight and a very low viscosity at temperatures only slightly above, i.e. about 10° C., their melting or softening point. For example, the viscosity of fiber-grade PET is only about $4 \times 10^3$ poise at 280° C. With viscosities of this magnitude, such polyester resin would simply drip away from a fibrous reinforcement and the reinforced sheet would sag and lose all its coherency during the external preheating stage before it could be inserted in a cold mold for stamping or drawing into a shaped article. The instant invention employs viscosities which are even lower, e.g. 100 to 400 poise at 280° C. I have now unexpectedly found that the coherency of the preheated sheet comprising PET resins of these very low viscosities can be retained on the fibrous reinforcement by using a novaculite particulate filler. The fibrous mat can be made from long fibers of graphite or glass or a mixture thereof forming either a structurally well-defined coherent fibrous phase or layer, e.g. a non-woven mat, a woven cloth, intertwined or agglomerated fibers held together either by adhesive resinous binders or mechanically by stitching, or a random web of supporting fibers can be utilized.

These long fibers are in contradistinction to short, chopped fibers, e.g. about ½" in length or shorter, which I have found do not afford the necessary coherent structural strength. By the use of such a fibrous mat, the polyester resin, when heated over its softening point, is retained by surface tension between the interstices of the mat, and by capillary action between the fibers comprising the strands thereof. Relatively low molecular weight PET can be used, i.e. PET of a molecular weight which heretofore has not been considered useable to form useful objects by any standard thermoplastic processing method. These extremely low molecular weights result in decreased melt viscosities, for example, $2 \times 10^2$ poise at 280° C. and 70 poise at 300° C., which allows highly effective polymer-fiber interaction, i.e. fiber wetting. In addition, the low molecular weight of the PET leads to both higher crystallization rates and higher levels of ultimate crystallinity, which are desirable characteristics because early development of crystallinity results in a greater initial stiffness which reduces the necessary residence time in the mold of the shaping apparatus.

While these immediately aforementioned desirable features are to be expected from low molecular weight PET, such PET has not been employed previously to form fibers, films, or moldings, because of the inherent shortcomings of such PET including, inter alia, extremely high melt fluidity and extreme brittleness of the solidified polymer. It is a specific aim of this invention to utilize such low molecular weight PET in combination with the coherent fibrous reinforcement described hereinabove and with a novaculite filler as hereinafter described to thereby form a composite material which exhibits all of the desirable features of the low molecular weight resins, but in which the undesirable features thereof are taken advantage of in order to afford sheet materials and articles cold formable therefrom having physical properties heretofore unobtainable with such materials. This exploitation of the material deficiencies, as well as the material advantages, is possible because of the nature of the forming process and the unique effectiveness of novaculite, as described hereinafter.

The low molecular weight, fiber-reinforced, novaculite-filled PET matrix sheet of this invention is found to exhibit excellent properties such as high impact and flexural strength. These sheets are also characterized by substantially higher heat distortion temperature than hitherto known reinforced thermoplastic sheets.

It is therefore an object of the invention to provide a novel glass-filled composite sheet of high melting semi-crystalline PET that can be preheated and then shaped in a cold mold. The term "cold mold," as used herein, connotes a mold having a maximum temperature during the forming operation of about 100° C. and preferably about 70° C.

It is another and more specific object of the instant invention to provide novel composite sheets of semi-crystalline PET which are reinforced with glass or graphite fiber or a mixture thereof and which contain a novaculite mineral filler, which sheets have high melting temtemperatures and which can be preheated and then shaped using a relatively rapid cycle in a cold mold.

These and other objects of the invention will become apparent from the accompanying detailed description and examples.

BRIEF DESCRIPTION OF THE DRAWING

The figure depicts means which can be employed in preparing and utilizing in a continuous manner the thermoplastic sheets of the instant invention and in particular, a method or technique which allows the fiber-reinforced novaculite-filled sheet to be preheated and handled so that the sheet is rapidly formable by stamping in a press using a cold mold.

DESCRIPTION OF THE PREFERRED EMBODIMENTS

In accordance with the instant invention, exceptionally good-shaped products can be obtained from composite glass and/or graphite fiber-reinforced, novaculite-filled, thermoplastic sheets prepared from semi-crystalline polyester. In particular, items produced from glass or graphite reinforced novaculite-filled PET show excellent performance at elevated temperatures and exceptional dimensional stability (low moisture absorption).

The semi-crystalline polyester polymers employed in the instant invention are generally a non-molding grade polymer having a weight average molecular weight of from about 5,000 to about 45,000 as determined by dilute solution viscosity measurements and have a level of crystallinity ranging from about 20% up to about 60% as determined by X-ray techniques In addition to PET, other polyesters of similar molecular weight and degree of crystallinity can, as heretofore indicated, be utilized. The term "polyester," as used in this invention, encompasses both polyesters and also copolyesters which contain less than 30% of a modifying constituent or constituents, i.e. a second acid, a second diol, or both. The preferred polyesters for purposes of this invention are those obtained from ethylene glycol and terephthalic acid, i.e., polyethylene terephthalate and copolyesters thereof. The copolyester can contain more than three combined copolymerizable constituents if desired and can also involve other linkages such as amide and ether linkages. Additionally, blends of the various polyesters can be used if desired.

Any of the dibasic acids or their derivatives which are capable of forming polyesters with glycols can be utilized as components of the polyester. Suitable dibasic acids include terephthalic, isophthalic, the various naphthalene dicarboxylic (i.e. 1,5; 2,6; and 2,7), hexahydroterephthalic, bibenzoic and substituted terephthalic, and as modifying constituents oxalic, malonic, succinic, adipic, suberic and sebacic acid and the like.

Suitable glycols include those having the general formula $HO(CH_2)_n OH$ where $n=2$ to 10 and also neopentyl glycol, dimethylol cyclohexane, cyclohexane diol, and diphenols such as the various bisphenols and the naphthalene diphenols (i.e. 1,4; 1,5; 2,6; and 2,7) and the like.

The polyester preferably used in the instant invention will have a weight average molecular weight of from about 5,000 to about 45,000, preferably 10,000–35,000. Such a low molecular weight PET or other polyester can be obtained by either direct polymerization of the above-mentioned glycols and dibasic acids, or by any one of several degradative operations performed upon higher molecular weight polymer or by neutral or acid catalyzed partial hydrolysis of higher molecular weight polyester. The preferred polyester is PET.

Normally, any degradation, i.e. lowering of molecular weight, which may occur during normal PET film- or fiber-forming operations in considered highly detrimental to the finished product. In PET, as with other polymers in general, a number of mechanical properties, including flexural life, tensile strength, tensile elongation and impact strength generally decrease as the molecular weight of the polymer decreases. With PET in particular, the lowering of the molecular weight below about 45,000 has heretofore resulted in polymers which were not formable into useful objects because of their extreme brittleness (with concomitant low impact strength) and high fluidity (resulting in difficulty in processing). However, in accordance with the present invention, novaculite-filled PET having a molecular weight below 45,000 in combination with the reinforcing fiber phase as described herein, can be used to produce molded or shaped articles of extremely high impact strength. Furthermore, it is the extremely low viscosity of such PET which allows thorough wetting of the fiber strands by the molten polymer, and which thereby results in the improved properties of the composite sheet produced by the method of the instant invention. The resultant product does not contain, to a noticeable degree, the entrapped microvoids which usually occur in the fabrication of composites by the impregnation of fibrous reinforcement when using viscous, high molecular weight polymers.

Another advantage of using low molecular weight polymer in combination with a long fiber reinforcement is that the rapid initiation period for crystallite growth and the high degree of attained crystallinity, results in a product with a number of desirable properties such as excellent solvent resistance at elevated temperature, improved stiffness, and excellent impact resistance at all temperatures. Improved properties of this kind are not obtained with PET reinforced with short fibers, or with long fiber-reinforced, non-crystalline polymer composites. As has already been noted, the low viscosity of such low molecular weight PET does not allow fabrication into shaped articles by the process of this invention unless it is employed in combination with long glass—and/or graphite fiber reinforcement.

As heretofore indicated, I have found novaculite to be uniquely advantageous as a filler for the PET. Novaculite is a naturally occurring variety of quartz, which is itself a polymorph of crystalline silica, i.e. silicon dioxide ($SiO_2$) and is not to be confused with glassy vitreous silica. Amorphous silica, such as silica gel, colloidel silica, fumed silica, etc., is a substantially dehydrated polymerized silica often thought of as a condensation polymer of silica acid, $Si(OH)_4$, of extremely high-surface area (50–800 m.²/g.) This special character, as well as high cost, eliminates amorphous silica from consideration as a general purpose filler for polymers. The various polymorphs of crystalline silica, or quartz, however, are often used as low cost fillers for both thermosets and thermoplastics. The forms of $\alpha$-quartz or low-quartz can be generally divided into two categories: coarsely crystalline quartz and fine-grained varieties. As the name implies, the grains of the coarse variety are clearly visible to the naked eye. Examples include amethyst, smoky quartz, rose quartz, citrine, aventurine, etc. Finely crystalline quartz possesses individual grains or fibers which can be seen only under high magnification.

Varieties of finely crystalline quartz include carnelian, sard, prase, plasma, agate, onyx, flint, chert, chalcedony, jasper and novaculite. Quartzite and sandstone are firmly compacted rocks also in the above category. All forms of quartz are 90–99% pure $SiO_2$, and the various names are used to describe differing crystal shapes, grain-sizes, and the several effects of the low percentages of included foreign elements.

Surprisingly, all other forms or phases of silica and of quartz are distinctly inferior in comparison with novaculite when used as a filler for the composition which is the subject of this invention. Novaculite is a microcrystalline form of $\alpha$-quartz which is found in useable quantities in and around the Devonian-Mississippian deposits of Hot Springs, Arkansas in the United States. Under the petrographic microscope, the grains of quartz are seen to possess smooth, very slightly curved surfaces. Large particles are clusters of crystals which are easily broken down into smaller grains. The particle shape of novaculite is believed to be unique among all other forms of quartz. Particles are generally square or rectangular in outline, and in three-dimensional aspect might be designated as pseudo-cubic or rhombohedronic. Novaculite is closely related to chert and flint, although mineralogical inspection reveals significant differences in crystalline form, since fine-sized particles of chert or flint, or most other forms of fine quartz, possess irregular, jagged outlines and edges. (Ref.: Dana's System of Minerology by C. Frondel, Vol. III, 1962, Wiley, N.Y.)

While I do not wish to be bound by any mechanistic interpretation, it is believed that the uniquely advantageous properties of novaculite in the composition and process of the instant invention are due to its peculiar anhedral platelet crystalline form and non-hydroscopic characteristics, the latter probably due to the fact that the surface is believed to be packed with siloxane bridges rather than silanols (SiOH), as is generally the case with most other forms of silicon dioxide. Other factors which may have an influence on the improved properties of this composition are the improved flow properties obtained in the melt during processing, resulting from the peculiar crystalline form and substantially invariant aspect ratio of the novaculite crystallites; and improved wetting and adhesion of the novaculite by the PET phase. The essential fact is that novaculite as a particulate filler provides a unique reinforcing effect which is not exceeded even by fibrous fillers when used in conjunction with polyesters, particularly PET.

The particle size of the novaculite useful in the practice of the instant invention can range up to a maximum of about 100$\mu$, preferably less than about 25$\mu$. There is no minimum particle size although, in fact, particles less than 1$\mu$ in size are comparatively rare.

An optimum and particularly preferred mean particle size is approximately 5$\mu$, having a distribution approximately as follows:

| | Percent |
|---|---|
| 10$\mu$ or less | 100.0 |
| 5$\mu$ or less | 80.0 |

These figures regarding particle size distribution should not be regarded as limiting, since other ranges of distribution are also useful.

As with other forms of silica, including fibrous glass, novaculite can be treated with standard sizing agents, finishing agents, and/or organo-silanes or other coupling agents. The application of such agents to siliceous surfaces is well known to those skilled in the art. A special advantage in the use of novaculite filler is that utilization of these coupling agents is not mandatory because of the special affinity of the PET resin phase for the novaculite filler phase.

The term "glass (or graphite) fibers," as used herein, is intended as heretofore indicated, to be employed in a broad sense to include woven cloth as well as non-woven, individual, continuous fibers, more particularly known as filaments, which fibers have a length greater than 1 inch and preferably between about 1.25 in. and about 3.0 in.; groups of twisted strands, more particularly known as yarn or thread; untwisted or slightly twisted groups of strands; generally looped back on one another, more particularly known as roving; discontinuous lengths of fibers, more particularly known as staple fibers which can be spun into threads, twisted strands, sliver, roving or yarn. In addition, mechanically bound discontinuous, nonwoven glass or graphite roving, yarn, or strands can be employed. The method of mechanical binding may be by "needling," i.e. stitching or by depositing the long fibers in such a manner as to form an entangled, stable mat.

The relative proportions of the components comprising the sheets of the instant invention, i.e. of polyethylene terephthalate or other polyester as the matrix, the novaculite filler and the reinforcing glass and/or graphite fibers can vary over a broad range within the following limits. The novaculite filler can comprise from about 10 to about 60 weight percent of the sheet, preferably about 15 to 50 weight percent. The fibrous reinforcement can comprise from about 10 to about 60 weight percent of the sheet, preferably about 15 to 50 weight percent. The polyester should comprise a minimum of about 20 weight percent of the sheet and a maximum of about 70. Preferably, the polyester will comprise 30 to 60 weight percent of the formulation.

Various processing techniques can be employed in the preparation of the reinforced composite sheets of the present invention. The plastic sheet can be formed by casting a mixture of molten polymer, novaculite and glass fiber onto a flat surface until the composition has set so that it is self-sustaining and can be handled as a unitary sheet material. Alternatively, and a preferably, novaculite filled plastic sheet can be extruded separately and then interlaminated with alternating novaculite-filled plastic sheet and glass mat or loose fiber layers, which multiple layers are then thoroughly fused under heat and pressure to form a single unitary sheet.

As an additional alternative, novaculite filled polyester in powder form can be dispersed as uniformly as possible into one or more layers of glass or graphite fiber mats and this assembly then fused by compression molding, preferably in an inert atmosphere to thereby form the composite sheets of the instant invention.

The novaculite is ordinarily incorporated into the polyester by conventional means. For example, the desired quantities of polyester, preferably in pellet form, and novaculite are mixed in a Buchler rotator or similar low-intensity mixer. This mixture is then extruded and chopped into pellets which can be ground to the desired particle size prior to deposition onto the supporting fibrous mat or extrusion as filled sheet.

Continuous preparation and utilization of the high-impact thermoplastic sheet of the instant invention is shown using a single glass mat in the figure. A pair of extruders 10, into which the novaculite-filled resin is fed at 11, extrudes a sheet 12 over support rollers 13, and are fed to a pair of guide rollers 16. The temperature is suitably maintained by means of infrared heaters 14 and 15. A glass mat 17, or alternately loose glass fiber which can be used after suitable preheating, is also fed between the rollers 16 so that it is sandwiched between the two extruded, filled thermoplastic sheets 12. The laminate is integrated by two sets of calendering rollers 18 and 19, cooled at 20 such as by chilled air and then fed by suitable rollers 21 to a sizing knife and block 22 and 23. The sized laminate may thereafter take an alternate direction 25 where it is stored and packaged at shipping 27 or where it may be delivered to a forming operation 26 where a stamping apparatus, which consists conventionally of a die 28 and stamp 29, in cooperation with an optional hold-down ring 30, forms the laminate 31 into a suitable shape as shown by the broken line 32. An appropriate mechanism such as spring 33 may be employed to eject the formed article from the die 28.

The shaped article forming process of the instant invention can be more broadly described as comprising the following steps:

(a) Preheating a sheets comprising novaculite filled polyester polymer reinforced with a coherent fibrous reinforcing phase in which fibers of at least one inch in length are incorporated, to a temperature between the softening point of said polymer and 300° C.;

(b) Placing the preheated sheet in the shaping apparatus, the molding parts of which are maintained at a temperature not in excess of about 10° C. above the glass transition temperature of the base polymer; which for the polyesters of the instant invention, is a maximum of about 100° C.;

(c) Shaping the said sheet and maintaining molding pressure until the shaped article cools and/or crystallizes sufficiently to preserve its shape;

(d) Withdrawing the shaped article from the mold.

Example 1

Glass-reinforced novaculite filled PET sheet is prepared using a polymer having a weight average molecular weight of 60,000–70,000 as follows. Thirty parts by weight of PET pellets and 40 parts of novaculite having a mean particle size of $10\mu$ and a maximum particle size of about $18\mu$ were blended in a Buchler rotator. The resulting semi-homogeneous blend was then fed through a Brabender extruder and the extrudate then chopped and ground.

The ground and dried novaculite filled polymer was then dispersed between layers of nonwoven glass mats constructed from discontinuous chopped fibers of 2-in. minimum length. Seven layers of glass mat were used to produce an ⅛ in. thick composite sheet weighing 30 parts producing a weight ratio of filled polymer to glass of about 70:30. The polymer was distributed between the layers as uniformly as possible. Fusion of the sandwich assembly was carried out in a compression mold in a dry nitrogen atmosphere at 285° C. The final step of fusion was carried out at 100 p.s.i. for 5 minutes.

Shaping was accomplished in a deep-drawing press which had a triple-action die-set to produce 5-in. diam. cylindrical cups. The glass-reinforced filled sheet was preheated to 240° C. for 6 minutes in an atmosphere of relative humidity equal to 50%. Exposure of the polymer to this amount of moisture at this elevated temperature resulted in controlled hydrolytic degradation of the polymer down to a weight average molecular weight of approximately 25,000, as determined by the methods described below. Such a low molecular weight polymer has heretofore not been utilized to form useable fibers, films or molded objects.

The preheated sheet was stamped in a conventional manner with the die maintained at room temperature (23° C.) with the dwell time set at 10 seconds to allow the shaped part to crystallize in the mold and to cool below 150° C. before removal therefrom. The stamping pressure was 100 p.s.i. Physical properties were determined upon the part thus obtained by cutting test specimens from the shaped cup. The properties obtained are shown in Table I. All mechanical properties were obtained under standard ASTM test conditions.

The molecular weight of the PET in the filled polymer-glass composite after hydrolytic degradation can be determined by a modification of the standard solution viscosity measurements. A sample of the composite is placed in a furnace at 600°–700° C. for 6 hours, after which time the polymer is completely vaporized. The exact amount of glass plus novaculite filler in the composite is thus determined by weighing the residue. Another sample of filled polymer-glass composite is simultaneously dissolved in an appropriate solvent such as o-chlorophenol. The polymer solution is separated from the glass and novaculite by simple filtration and, since the glass plus novaculite content of the composite is now known, the amount of polymer in solution is also known. The molecular weight is determined by any one of several solution viscosity measurements as is known to any chemist skilled in the art. For example, with a solvent system such as tetrachloroethane/phenol (1:1 mix at 30° C.), the Mark-Houwink equation relating intrinsic viscosity of PET to molecular weight is $$[n] = 2.29 \times 10^{-4} \quad M_w \ 0.73$$

Example 2

Glass-reinforced novaculite-filled PET sheet was prepared in the same manner as shown in Example 1. Shaping of the glass-reinforced PET was accomplished in the same manner as shown in Example 1, except that the stamping pressure was 500 p.s.i. Mechanical properties of samples taken from objects shaped in this manner are presented in Table I.

Comparing the shaping conditions of Example 1 and Example 2, it is seen that the only difference is the stamping pressure, which is five times higher in Example 2 than in Example 1. The physical properties of the specimens of Example 2 are generally superior to those of Example 1. It can be concluded that the higher stamping pressure resulted in more intimate contact between the filled polymer and glass reinforcement and in a decrease in the volume and/or number of voids which are inherent in all polymer-glass systems. This decrease in detrimental voids and more intimate polymer-glass contact results in the improved properties of the specimen of Example 2. Determination of the void content or impregnation efficiency can be made by any of several known micro-photography techniques.

Example 3

Glass-reinforced novaculite-filled PET sheet was prepared in the same manner as shown in Example 1, except that the weight average molecular weight of the starting polymer was 20,000. PET of such low molecular weight, as noted heretofore, is not normally considered suitable to form molded objects. In the instant case, shaping was accomplished by preheating the composite sheet at 280° C. for 6 minutes in a dry nitrogen atmosphere. The absence of moisture thus precluded further degradation of the polymer and the molecular weight remained at an essentially constant level. Further forming by stamping of the composite sheet was accomplished in a manner identical to that of Example 1, and the physical property results are presented in Table I.

As compared to Example 1, it is seen that the molecular weight of the PET polymer is 20% less and the preheat temperature has been increased to just above the crystalline melting point of the PET. The 20% decrease in molecular weight decreases the melt viscosity by approximately 50%, as can be determined by the standard and well known relationship between viscosity and molecular weight for polymers, i.e.

$$n \text{ melt.} = KM_W 3.4$$

Also, the significant decrease in melt viscosity at temperatures just above the crystalline melting point of PET lowers the melt viscosity to 100–400 poise, which is 1/500–1/1000 the viscosity of high molecular weight polymers of styrene-acrylonitrile or polypropylene at a suitable forming temperature. This extremely low melt viscosity allows intimate contact between the polymer and the fibrous reinforcement and thereby results in extremely good mechanical properties even at low stamping pressures. As can be seen from Table I, the mechanical properties of the specimens of Example 3 are even better than those of Example 2, although the stamping pressure is only 100 p.s.i. compared to the 500 p.s.i. stamping pressure of Example 2.

Example 4

It can be concluded from the previous examples that by increasing the stamping pressure to 500 p.s.i. while keeping all of the variables of Example 3 constant should lead to further optimization of the mechanical properties.

The composite sheet preparation procedure and shaping procedure of Example 3 was repeated, except that the stamping pressure was increased to 500 p.s.i. The results are presented in Table I. It is seen that, in general, the best mechanical properties are obtained with the specimens of Example 4. Photomicroscopic examination of specimens prepared in Example 4 shows almost a complete absence of microvoids.

Examples 5–9 (comparative)

The effect of the novaculite in comparison with other inorganic fillters and with unfilled PET was evacuated in this experiment. Glass-reinforced PET sheet containing a variety of conventional fillers was prepared and cold formed as in Example 1 except different fillers or no filler were substituted for novaculite. In Examples 5 and 6, the PET:filler weight ratios were the same as in the previous examples.

Example 5

Calcium carbonate having a mean particle size of 2.5μ was utilized as the filler instead of novaculite. The smaller mean particle size of the $CaCO_3$ relative to novaculite should tend to enhance the effectiveness of the former. However, as indicated in Table I, the tensile strength and modulus of the $CaO_3$ filled sample are substantially inferior to those of the novaculite filled sample of Example 1.

Example 6

Ground crystalline quartzite of a mean particle size of 4μ was substituted for novaculite. This material is referred to by minerologists as Oriskany quartzite, which like novaculite is, a form of α-quartz. However, microscopic examination of this material shows irregular particles with numerous jagged edges. Table I shows the sample of sheet prepared therefrom to be noticeably inferior to the novaculite filled sample of Example 1. This difference is surprising since this quartzite is one of the forms of quartz nearest to novaculite minerologically (see Dana's System of Minerology, C. Frondel, 1962, J. Wiley, N.Y.). This difference in effectiveness would seem to support my hypothesis that the particular crystalline form of novaculite is responsible for its uniquely superior effectiveness.

Example 7

A 60–15–25 PET-asbestos-glass fiber composite sheet was prepared in accordance with the procedure of Example 1. The asbestos fibers used were of the general form commonly used in the reinforcement of injection molded polymeric materials such as nylon, polypropylene, etc. Since asbestos is a fibrous material, i.e. a material having an aspect ratio greater than 100, it would be expected that a degree of reinforcement greater than that obtained using particulate novaculite as the filler would be obtained. This, of course, is dependent upon the fact that fibrous materials act as stress distributors and are considered true reinforcing agents, in contradistinction to the generally stress concentrating particulate agents.

The mechanical properties of the sheet are presented in Table I. It is apparent that the reinforcing effect which would be expected has not been observed. Mechanical properties of this material are generally inferior to those of the material of Example 1, although this material does have a higher glass content. In particular, it should be noted that the tensile and flexural moduli are lower. The only improved property of the material of this example is the impact strength, where the fibrous asbestos appears to act advantageously. In general, however, it can be concluded that this composition is inferior.

Examples 8 and 9

A sheet containing 80% PET and 20% glass mat and no particulate filler was prepared essentially as in Example 1. Mechanical properties of this material are presented in Table I (Example 8). A comparative sample of 50–30–20 PET-novaculite glass fiber was also prepared in a similar manner. Properties of this material are likewise presented in Table I (Example 9). It should be noted that the weight percent of glass fiber reinforcement is identical in both Example 8 and Example 9, i.e. 20 weight percent. However, the material of Example 9 contains 50 percent by weight of inorganic filler (particulate plus fibrous) while the material of Example 8 contains only 20 percent inorganic phase. A tremendous cost savings can, of course, be realized by utilization of the composition of Example 9 over the material of Example 8, since the particulate phase is by far the least costly ingredient of the three considered.

Comparison of the properties presented in Table I reveals results heretofore never encountered in the art. Although it would be expected that the increased inorganic particulate content would increase the tensile and flexural moduli of a polymeric system, it has also heretofore been experienced that the presence of the particulate phase, which acts as a stress concentrating factor, would decrease all other mechanical strength parameters. However, the mechanical strengths, including tensile, flexural, shear and compressive are all substantially increased by incorporation of novaculite particulate filler. It therefore appears that the particulate novaculite dispersed in the PET matrix is behaving as a stress distribution agent, although it is not a fibrous material, and is, in fact, "particulate" in every sense of the word.

TABLE I.—ROOM TEMPERATURE MECHANICAL PROPERTIES

| Property | Units | Sample number | | | | | | | | |
|---|---|---|---|---|---|---|---|---|---|---|
| | | 1 | 2 | 3 | 4 | 5 | 6 | 7 | 8 | 9 |
| Tensile strength | P.s.i. | 12,000 | 13,000 | 13,500 | 14,000 | 8,000 | 10,300 | 11,100 | 9,100 | 11,500 |
| Ultimate elongation | Percent | 1.4 | 1.4 | 1.3 | 1.5 | 0.9 | 1.25 | 2.0 | 1.3 | 0.9 |
| Tensile modulus | P.s.i. $\times 10^{-6}$ | 1.9 | 2.0 | 2.0 | 2.0 | 1.2 | 1.36 | 0.95 | 0.98 | 1.52 |
| Flexural strength | P.s.i. | 20,000 | 24,000 | 24,500 | 26,500 | 18,000 | 18,700 | 13,400 | 15,200 | 17,900 |
| Flexural modulus | P.s.i. $\times 10^{-6}$ | 1.6 | 1.7 | 1.7 | 1.8 | 1.1 | 1.6 | 0.76 | 0.88 | 1.28 |
| Shear strength | P.s.i. | 13,000 | 14,000 | 15,000 | 17,000 | 12,000 | 12,000 | 14,000 | 11,100 | 12,300 |
| Compressive strength | P.s.i. | 25,000 | 27,500 | 27,000 | 28,000 | 25,000 | 16,000 | 21,400 | 22,000 | 28,000 |
| Izod impact strength | Ft. lbs./in. notch | 5 | 5 | 5 | 5 | 5 | 6 | 13 | 4 | 4 |
| Broadface impact strength | Ft./lbs./in. | 7.0 | 7.5 | 7.0 | 7.0 | 8.0 | 8.0 | 14 | 5 | 6 |
| Density | G./cc. at 23° C. | 2.03 | 2.06 | 2.03 | 2.06 | 1.70 | 2.0 | 1.75 | 1.73 | 1.83 |
| Water absorption | Wt. percent/24 hrs. | 0.15 | 0.15 | 0.15 | 0.15 | 0.15 | 0.16 | 0.17 | 0.17 | 0.15 |
| Coeff. linear thermal expression | $10^{-5}$ in./in./° C. | 2 | 2 | 2 | 2 | 3 | 2.1 | 3 | 3 | 2 |
| Heat deflection temp. at 264 p.s.i. | ° C. | >240 | >240 | >240 | >240 | >240 | ~240 | 235 | ~230 | >240 |

I claim:
1. A composition comprising
   (a) from about 20 to about 70 weight percent of a thermoplastic polyester having a weight average molecular weight ranging from about 5000 up to about 45,000 and a crystallinity ranging from about 20 percent up to about 60 percent.
   (b) from about 10 to about 60 weight percent novaculite having a maximum particle size of about 100 microns.
   (c) from about 10 to about 60 weight percent of graphite or glass fiber or a mixture thereof wherein said fibers have a length of at least about one inch.
2. A composition in accordance with claim 1 wherein said polyester is polyethylene terephthalate.
3. A composition in accordance with claim 1 wherein said polyethylene terephthalate has a number average molecular weight ranging from about 10,000 up to about 35,000.
4. A composition in accordance with claim 1 wherein said polyester is present in an amount ranging from about 30 up to about 60 weight percent.
5. A composition in accordance with claim 1 wherein said novaculite has a maximum particle size of about 25 microns.
6. A composition in accordance with claim 1 wherein said novaculite is present in an amount ranging from about 15 to about 50 weight percent.
7. A composition in accordance with claim 1 wherein said fiber is glass fiber and said glass fiber is present in an amount ranging from about 15 up to about 50 weight percent.
8. A sheet formed from the composition of claim 1, said sheet being formable in shaping apparatus, the molding parts of which are maintained at a temperature no greater than about 10° C. above the glass transition temperature of said polyester.

References Cited

UNITED STATES PATENTS 3,516,957   6/1970   Gray et al.    260—40 R

FOREIGN PATENTS 1,010,043   11/1965   Great Britain    260—40 R

OTHER REFERENCES

Lodoo et al., Nonmetallic Minerals, McGraw-Hill, 1951, p. 429.

MORRIS LIEBMAN, Primary Examiner

S. M. PERSON, Assistant Examiner

U.S. Cl. X.R.

106—28.8 B